US007171369B1

(12) United States Patent  
Bertram et al.

(10) Patent No.: US 7,171,369 B1  
(45) Date of Patent: Jan. 30, 2007

(54) METHOD AND SYSTEM FOR PROVIDING DYNAMIC AND REAL-TIME AIR TRAVEL INFORMATION

(75) Inventors: Jeffrey Mark Bertram, Peachtree City, GA (US); Albert Edward Houck, III, Tyrone, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 174 days.

(21) Appl. No.: 09/708,890

(22) Filed: Nov. 8, 2000

(51) Int. Cl.
*G06Q 99/00* (2006.01)

(52) U.S. Cl. ............................................. 705/1; 705/5
(58) Field of Classification Search ................. 705/1, 705/5
See application file for complete search history.

(56) References Cited

U.S. PATENT DOCUMENTS

| | | | | |
|---|---|---|---|---|
| 4,449,186 A | * | 5/1984 | Kelly et al. ..................... | 705/5 |
| 5,239,480 A | * | 8/1993 | Huegel .......................... | 705/5 |
| 5,408,417 A | * | 4/1995 | Wilder .......................... | 705/5 |
| 5,692,342 A | * | 12/1997 | Devlin, Jr. ..................... | 52/36.1 |
| 5,710,887 A | * | 1/1998 | Chelliah et al. ............... | 705/26 |
| 5,724,520 A | | 3/1998 | Goheen | |
| 5,726,885 A | | 3/1998 | Klein et al. ............ | 364/423.098 |
| 5,732,398 A | * | 3/1998 | Tagawa ......................... | 705/5 |
| 5,732,400 A | | 3/1998 | Mandler et al. | |
| 5,797,126 A | | 8/1998 | Helbling et al. | |
| 5,901,287 A | | 5/1999 | Bull et al. | |
| 5,914,671 A | * | 6/1999 | Tuttle ...................... | 340/10.42 |
| 5,920,053 A | | 7/1999 | DeBrouse | |
| 5,933,810 A | | 8/1999 | Okawa | |
| 5,933,811 A | * | 8/1999 | Angles et al. ................ | 705/14 |
| 5,943,651 A | | 8/1999 | Oosawa | |
| 5,948,040 A | * | 9/1999 | DeLorme et al. ........... | 701/201 |
| 5,953,706 A | | 9/1999 | Patel | |
| 6,044,353 A | * | 3/2000 | Pugliese, III ................. | 705/5 |
| 6,055,573 A | * | 4/2000 | Gardenswartz et al. ..... | 709/224 |
| 6,085,976 A | | 7/2000 | Sehr | |
| 6,101,477 A | | 8/2000 | Hohle et al. | |
| 6,108,636 A | | 8/2000 | Yap et al. | |
| 6,112,185 A | * | 8/2000 | Walker et al. ................ | 705/5 |
| 6,119,096 A | | 9/2000 | Mann et al. | |
| 6,127,917 A | * | 10/2000 | Tuttle ........................ | 340/10.1 |
| 6,137,895 A | | 10/2000 | Al-Sheikh | |

(Continued)

FOREIGN PATENT DOCUMENTS

EP     1164804 A1    12/2001

(Continued)

OTHER PUBLICATIONS www.nwa.com—Press Release Section.*

(Continued)

*Primary Examiner*—Jonathan Ouellette
(74) *Attorney, Agent, or Firm*—King & Spalding LLP

(57) ABSTRACT

Providing passengers and other interested parties with dynamic and real-time air travel information. This dynamic and real-time air travel information is shown in various screens on a computer monitor, and includes flight information, passenger information, other general air information, and advertising. The information is presented to passengers in a manner which reduces passenger wait time and allows gate agents to focus on other responsibilities. Information on seat standby status, upgrade standby status, and cleared standby status is provided on the computer monitor.

9 Claims, 10 Drawing Sheets

U.S. PATENT DOCUMENTS

| | | | |
|---|---|---|---|
| 6,289,326 B1 | 9/2001 | LaFleur | |
| 6,335,688 B1* | 1/2002 | Sweatte | 340/573.1 |
| 6,338,041 B1* | 1/2002 | Kawamata | 705/5 |
| 6,408,278 B1* | 6/2002 | Carney et al. | 705/14 |
| 6,591,263 B1* | 7/2003 | Becker et al. | 707/3 |
| 6,609,658 B1 | 8/2003 | Sehr | |
| 6,662,078 B1 | 12/2003 | Hardgrave et al. | |
| 2001/0016825 A1* | 8/2001 | Pugliese et al. | 705/5 |
| 2001/0032121 A1* | 10/2001 | Le | 705/14 |
| 2001/0042014 A1* | 11/2001 | Lowry et al. | 705/14 |
| 2002/0057212 A1* | 5/2002 | Hamilton et al. | 340/988 |
| 2002/0120518 A1* | 8/2002 | Carney et al. | 705/14 |
| 2002/0178034 A1* | 11/2002 | Gardner et al. | 705/5 |

FOREIGN PATENT DOCUMENTS

| | | | |
|---|---|---|---|
| WO | WO 9527949 A1 * | 10/1995 | |
| WO | WO 03/069447 A2 | 8/2003 | |

OTHER PUBLICATIONS

Reynolds, Mike, "Airport video off to a flying start; great demos promised as takeoff nears." Direct, v3, n2, p. 36(1), Feb. 1991.*

"Wave of the Future? Agents Ponder American AAccess," Travel Agent, v 281, n 6, p. 2, Jul. 1, 1996.*

"American Attempts to Leapfrog Competitors with 'AAccess' System," World Airline News, v6, n26, Jul. 1, 1996.*

"American Airlines: Enhancements to AAccess Internet & Personal Software Programs Announced," M2 Presswire, Jun. 19, 1997.*

Truett, LF, "Reserve a Seat. Intelligent Transportation Reservation System for Tourists," Department of Energy, Report No. ORNL/CP-98868, CONF-980820, p. 10p, Dec. 31, 1998.*

"Delta Unveils High-Tech Advances in Atlanta," Aviation Daily, V 338, N 14, p. 5, Oct. 20, 1999.* www.nwa.com, retrieved from Internet Archive WayBack Machine <http://web.archive.org>, Oct. 31, 1999-Oct. 12, 1999; includes: "Northwest Airlines Announces Industry-leading Technology to Give Customers More Control and Convenience," Press Release, Jul. 17, 2000.*

Fitzsimons, Bernard, "Taking the hassle out of airline travel," Interavia Business & Technology, p. 31, Jan. 1995.*

"FIDS Will Change the Face of Airport Management if Airports Pay Attention," World Airport Week, v3, n11, Mar. 12, 1996.*

"United is Rising: 1999 Domestic Advertising Campaign to Focus on the Essence Of the Airline's Brand." PR Newswire, p. 2178, Jan. 4, 1999.*

Feldman, Joan M, "Controlling the airport data grid," Air Transportation World, v36n6, pp. 34-42, Jun. 1999.*

"Dotronix Announces Order Amounting to $700,000." Business Wire, Aug. 10, 1999.*

"All Systems Go: Legend Airlines Books Sabre for Reservation System and Airline IT Infrastructure; New Dallas Love Field-Based Airline Selects Expertise of Leading IT Provider." PR Newswire, Oct. 12, 1999.*

Field, David, "Displays spread word about flights." USA Today, p. 12B(1), Nov. 30, 1999.*

Flint, Perry, "Being last is not always the worst thing," Air Transport World, v36n9, pp. 68-69, Sep. 1999.*

United Web Site—Easy Travel Products; www.united.com/site/primary/0,10017,3141,00.html; May 9, 2001.

United Nov. 13, 2000 Press Release: *United Becomes First Airline to Offer Air Travel Wireless Booking*; www.united.com/site/primaryPR/0,10026,1534_713.00.html.

United Oct. 23, 2000 Press Release; *United Testing Self Check-In Kiosks in Chicago*; www.united.com/site/primaryPR/0,10026,1534_704,00.html.

United Oct. 23, 2000 Press Release; *United Testing Self Check-In Kiosks in San Diego*; www.united.com/site/primaryPR/0,10026,1534_702,00.html.

American Apr. 23, 2001 Press Release; *New Airport Technology Means Faster, Easier Trip "Through the Airport" on American Airlines*; www.amrcorp.com/news/200104_news_releases/20010423_airport.htm.

American Airlines Feb. 7, 2001 Press Release; *American Airlines Introduces Connecting Gate Information Display In Flight*; www.amrcorp.com/news/200102_news_releases/20010207_ifp_gate_info_display.htm.

American Airlines Feb. 6, 2001 Press Release; *American Airlines Delivers Proactive Flight Status Notification through AA.com*; www.amrcorp.com/news/20012_news_releases/20010206_flt_status_notice.htm.

American Airlines Nov. 2, 2000 Press Release; *American Airlines' Roving Agent Brings Wireless Airport Check In to the Passenger*; www.amrcorp.com/news/nov0200.htm.

American Airlines Jun. 28, 2000 Press Release; *American Airlines and Appris Contract to Develop Real-Time Delivery System of Flight Status*; www.amrcorp.com/news/jun2800b.htm.

American Airlines Apr. 3, 2000 Press Release; *American Airlines Unveils New Passenger-Oriented Gate Information Display System at O'Hare International Airport*; www.amrcorp.com/news/apr0300.htm.

American Airlines Mar. 16, 2000 Press Release; *American Airlines Offers Flight Information, Schedules Via the Palm VII Handheld Computer*; www.amrcorp.com/news/mar1600a.htm.

Lufthansa May 22, 2001 Press Release; *Lufthansa Announces a New Barcode Check-in and Boarding Process Using Wireless Application Protocol Phones and Handheld Devices*.

Lufthansa Mar. 5, 2001 Press Release; *Lufthansa Sales Target 2001: Expanding Its Leading Role In Europe*; cms.lufthansa.com/de/dlh/en/nws/0,1774,0-0-65983,00.html.

Lufthansa Nov. 15, 2000 Press Release; *Lufthansa Pins Its Hopes Increasingly On Future Technologies*; cms.lufthansa.com/de/dlh/en/nws/0,1774,0-0-65539,00.html.

Northwest Airlines; E-Services for Airport Processing; pp. 1-10.

Northwest Airlines; E-Commerce & E-Services Strategy; Jan. 2001; pp. 1-29.

Doherty, Rory; Sabre Teams with Impulsity to Delivery New Wireless Airport Check-In Capability; Oct. 18, 2000; (www.aeritas.com/aeritas.jsp?function=press&sub=1018001).

Meehan, Michael; *Sabre Rolling Out Wireless Check-In System For Air Travelers*; Computerworld; Oct. 20, 2000; (www.Aeritas.com/includes/press/Computerworld.htm.

Piller, Dan; *Wireless Airport Check-In To Use Cellphones, Hand-Held Computers*; Star-Telegram; Oct. 18, 2000; www.Aeritas.com/includes/press/StarTelegram.htm.

Research Disclosure; *Internet Note and Notification on Self-Service Intranet Access Devices*, May 1, 1999; UK; V. 42; Issue No. 421.

*Subcommittee on Aviation Hearing on Aviation Security and the Future of the Aviation Industry*; Sep. 21, 2001; http://www.house.gov/transportation/aviation/09-21-01/09-21-01memo.html.

* cited by examiner

METHOD AND SYSTEM FOR PROVIDING DYNAMIC AND REAL-TIME AIR TRAVEL INFORMATION

TECHNICAL FIELD

The present invention relates to the presentation of air travel information. More specifically, the invention relates to providing passengers and other interested parties with dynamic and real-time air travel information.

BACKGROUND OF THE INVENTION

As computer programs have advanced in the processing of air travel information, information has been provided to passengers, airport and airline personnel, and airport visitors, through computer monitors. The air travel information typically includes general air travel information, passenger information, flight information, and advertising information. This air travel information has usually been displayed on numerous computer monitors throughout airports, particularly in the boarding areas. As this information can be provided to passengers at boarding areas, passengers no longer need to wait in line to have their air travel questions answered by a gate agent. The display of air travel information has also saved airline agents time and allowed the agents to focus on other activities in place of answering passenger questions.

The scope of air travel information provided to passengers in the prior art is limited to static information. The air travel information has not been provided in a dynamic and real-time fashion. Furthermore, conventional systems have not allowed the passengers to bypass agents in obtaining updated boarding documents or to receive standby status information. Passengers have been required to wait in sometimes lengthy lines to ask a gate agent for real-time air travel information, standby information, and new boarding documents.

In view of the foregoing, there is a current need in the art to automate the delivery of dynamic and real-time air travel information to passengers in a manner which reduces passenger wait time and which allows gate agents to focus on other responsibilities. In addition, there is a current need to prepare and present to the gate agent a representation of what is currently being displayed on the passenger information display via the agent's workstation. For example, there is a need to display dynamic and real-time information on seat standby status, upgrade standby status, and cleared standby status.

SUMMARY OF THE INVENTION

The present invention solves the above problems by providing dynamic and real-time air travel information. This dynamic and real-time air travel information can include general air travel information, passenger information, flight information, and advertising information. Providing dynamic and real-time information is a radical change to the way airlines board flights and interact with their passengers.

The exemplary system can comprise a user reservation system, a Passenger Information Delivery System ("PIDS"), a Flight Progress Event System ("FPES"), a gate workstation ("workstation"), a Gate Information Display System ("GIDS"), and a computer network. The reservation system comprises a database of reservation records. The PIDS comprises a distributed data system for passenger information, where the FPES comprises a distributed data system for flight information. The workstation can be used by the gate agents to access and control the information shown to passengers. The GIDS comprises a passenger information display that presents responses to frequently asked questions and general air travel information for passengers. In this manner, gate agents are freed from performing this duty, thereby allowing them to focus on other responsibilities. The GIDS can be a series of screens that are shown on a computer monitor. The screens can comprise static information as well as dynamic and real-time information, including information on flights, passengers, airports, and advertising. The computer network is connected to each of these components and facilitates the exchange of information between the components.

Changes to flight or passenger information can be stored in the reservation system. The reservation system can forward passenger information to the PIDS and flight information to the FPES through the computer network. The PIDS and the FPES can forward the passenger information and flight information to the workstation through the computer network. The Internet can forward the general air travel information from the world wide web to the workstation. The workstation can forward the general air travel information, the passenger information, the flight information, and the advertising information to the GIDS through the computer network. The workstation and the GIDS can display dynamic and real-time general air travel information, passenger information, flight information, and advertising information. The workstation can display this information to the agents while and the GIDS can display this information to passengers and other interested parties.

The aforementioned advantages of the invention, as well as additional advantages thereof, are more fully described by the detailed description of exemplary embodiments and the accompanying drawings.

DETAILED DESCRIPTION OF EXEMPLARY EMBODIMENTS

Figure 1:
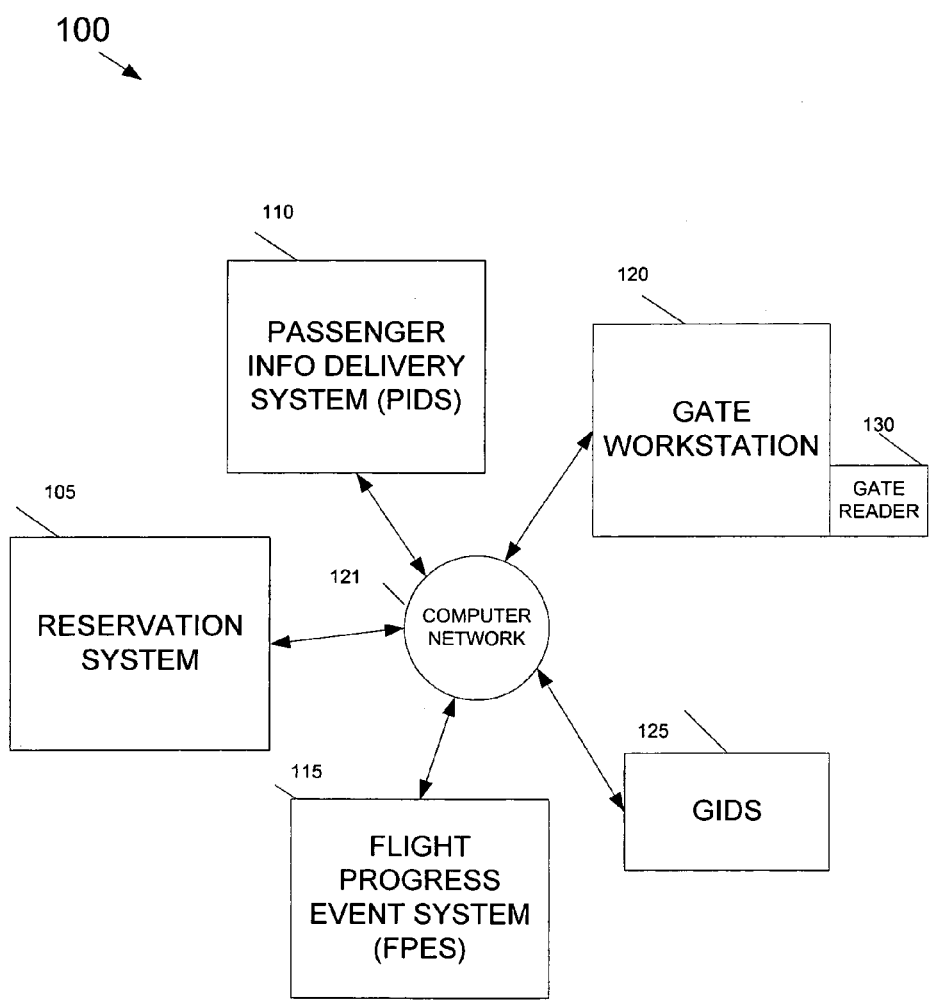
FIG. 1 is a functional block diagram illustrating an exemplary embodiment which can report actions between a reservation system, a PIDS, a FPES, a workstation, a GIDS, and a computer network.

The present invention provides a method and system for providing dynamic and real-time air travel information. This air travel information typically comprises flight information, passenger information, and other general information.

Flight information is displayed in real-time with minimal interaction from the gate agent. Flight events, such as delays, cancellations and gate changes, are sent directly to the screens through a sophisticated data delivery system that connects them to an airline's operations computers. Answers to passengers' most frequently-asked questions appear on screens, allowing passengers to avoid waiting in line to talk to a gate agent. The present invention also allows gate agents to efficiently use their time in the boarding process and assist passengers with their individual needs.

The passenger information typically comprises information on when it is a passenger's turn to board, when the passenger has obtained a seat assignment, and when the passenger has been cleared to board. Rather than having a computer monitor tell the agent this information, and then having the agent tell the passenger, the passenger information display will complete these tasks in one step. The airline has eliminated the entire distribution step of talking to the agent and then having the agent interface with the passenger. Now the presentation system communicates certain passenger related information directly to the passenger. This releases the burden on the agent, and gives the passenger a direct interface with the system.

General information can include pre-programmed messages. The system can quickly post these messages without distracting the agents from passenger service duties. Some pre-programmed messages include: airport facility information, airline policies, and weather conditions.

For an exemplary embodiment, within a predetermined amount of time of the departure of a flight from a gate, the system will display idle mode screens on a passenger information display. Idle mode screens show general air travel information and advertising information. The system displays idle mode screens until it recognizes a flight departure from its gate within 75 minutes, at which point it cycles to departure mode. From this point until departure time, flight-specific information will constantly be displayed in a left-hand blue window on the computer monitor. The left-hand window of the computer monitor will run through the departure mode screens, which are screens with general air travel information, flight information, and advertising information. The information displayed on both windows of the computer monitor is dynamic and real-time.

Once the plane is ready for boarding, the system will cycle from departure mode to boarding mode. The left-hand window of the computer monitor will run through the boarding mode screens, which are screens with general air travel information, flight information, passenger information, and advertising information. An important component is that the system displays standby information to passengers that currently is shown only to agents. The passengers are able to see that they have been cleared to board, and what their seat assignment is. In addition, the passengers can board immediately, and don't have to see the agent to get a new boarding card. If the passenger is standing by for an upgrade, the passenger can board with the original coach boarding pass. The workstation scans the ID from the boarding pass, recognizes that the passenger has a new seat, and prints a seating confirmation receipt during boarding. If the passenger is standing by for a seat, the workstation issues a bar-coded confirmation card when the passenger is added to the standby list. The workstation scans this card, identifies the passenger, and prints a seating confirmation receipt at the boarding door. The receipt usually takes about a second to print, so the boarding process can continue at normal speed, while completely eliminating the boarding card distribution step.

Figure 2:
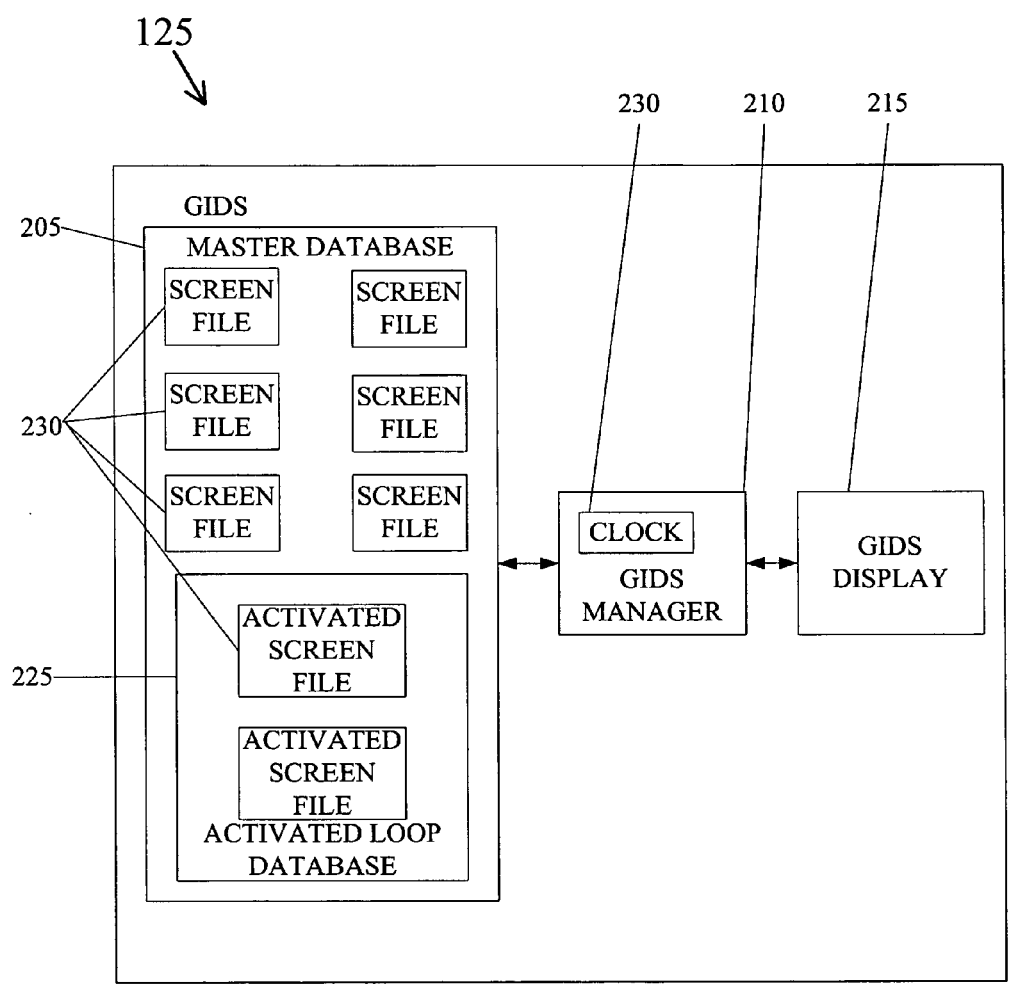
FIG. 2 is a functional block diagram illustrating an exemplary embodiment which can report actions between a GIDS master database, a GIDS manager, and a GIDS display.
Figure 8:
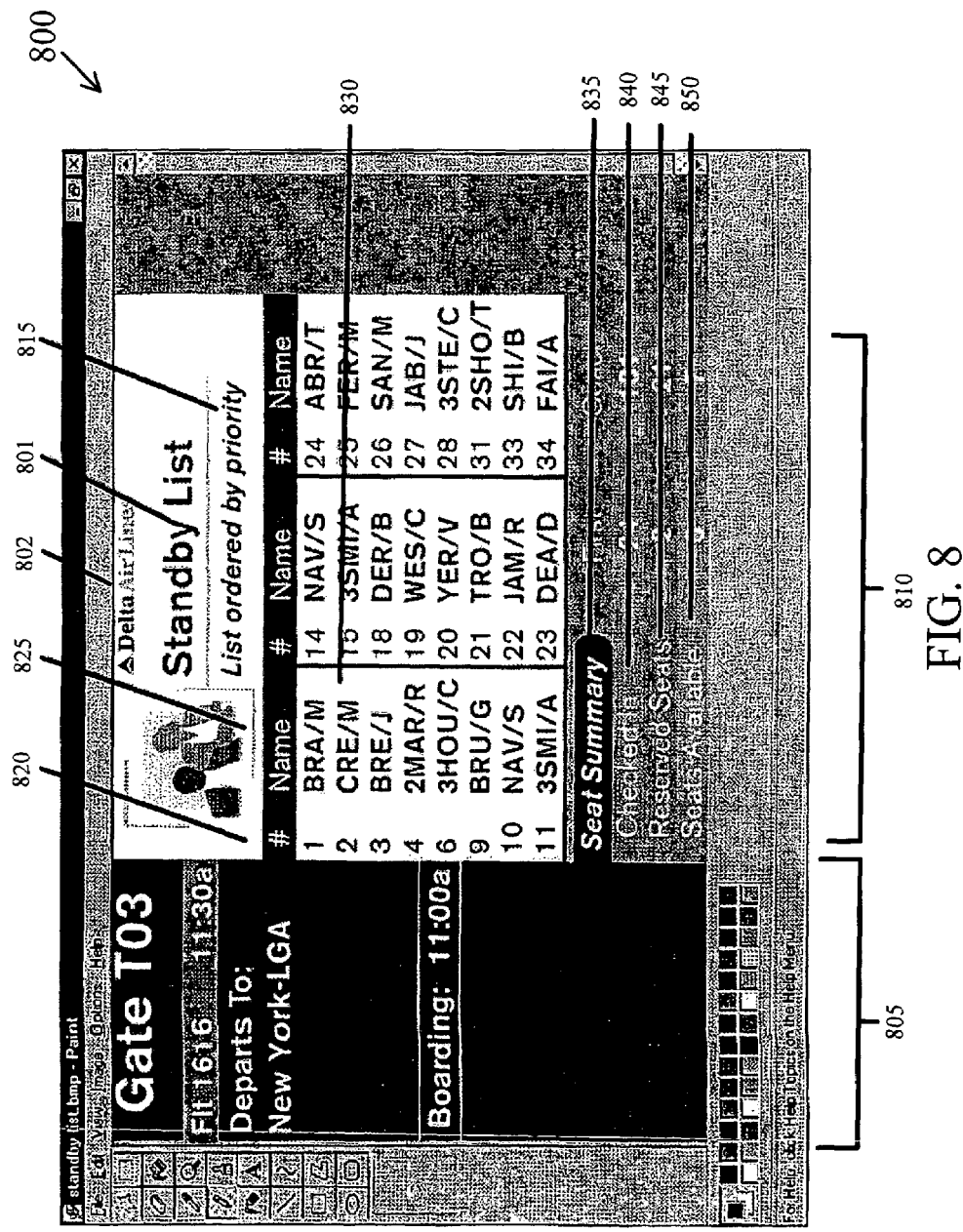
FIG. 8 is a screen display illustrating an exemplary embodiment of a standby list screen for presentation by GIDS.
Figure 9:
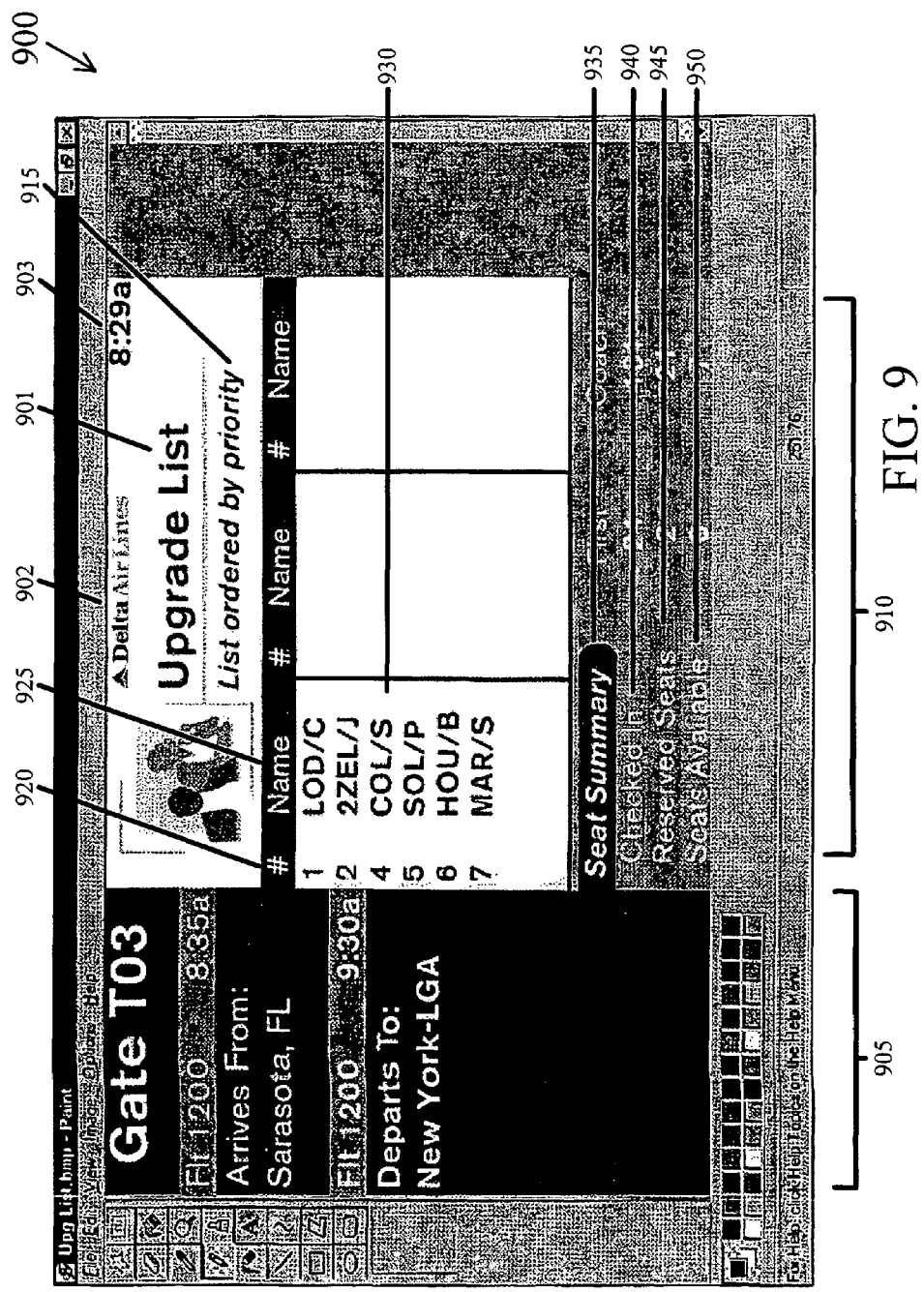
FIG. 9 is a screen displays illustrating an exemplary embodiment of an upgrade list screen for presentation by GIDS.
Figure 10:
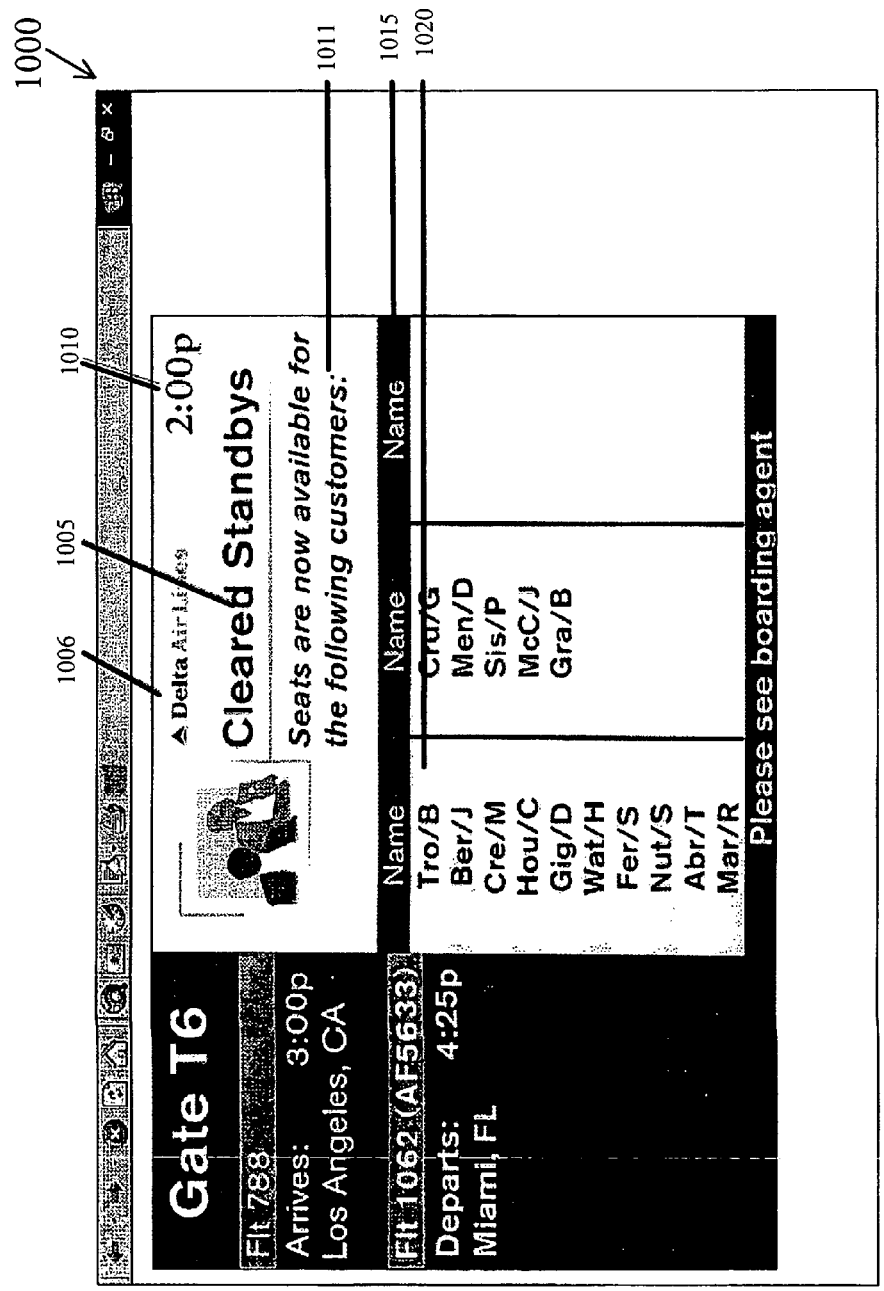
FIG. 10 is a screen display illustrating an exemplary embodiment of a cleared standby list screen for presentation by GIDS.

FIGS. 1–2 are block diagrams illustrating components of an exemplary embodiment of the present system. FIGS. 3–7 are flow diagrams illustrating exemplary methods for providing updated passenger information. FIGS. 8–10 are screen displays illustrating an exemplary embodiment of the current invention.

Those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

Referring now to the drawings, in which like numerals represent like elements throughout the several figures, aspects of the present invention and an exemplary operating environment will be described.

System Architecture

Turning now to FIG. 1, an exemplary embodiment of the present invention is described.

FIG. 1 is a functional block diagram illustrating the components of an exemplary presentation system. This exemplary system 100 comprises a reservation system 105, a Passenger Information Delivery System ("PIDS") 110, a Flight Progress Event System ("FPES") 115, a gate workstation ("workstation") 120, a Gate Information Display System ("GIDS") 125, and a computer network 121.

The reservation system 105 is the legacy database of record. This reservation system 105 holds all information about passengers and flights that will be maintained, updated, and displayed to the passengers. This system operates by query and response, and displays information for one passenger or one flight at a time. This includes information input by the gate agent, the ticket agent, kiosks, etc.

The PIDS 110 is a distributed data system for passenger information, consisting of an Oracle database and dynamic subscription service. The PIDS 110 provides real-time passenger information to the workstation 120.

The FPES 115 is Delta's distributed data system for flight information. The FPES 115 provides database and subscription data for flights in the same way the PIDS 110 provides these services for passenger data.

The gate workstation 120 is a workstation used by the gate agents. The workstation 120 is usually a personal computer which displays current information for all passengers and flights. In an exemplary embodiment, there are multiple workstations 120. The workstations 120 use the application Cornerstone.

The workstation 120 has a gate reader 130, which is a peripheral device attached to the workstation 120. The gate reader 130 consists of bar code and magnetic scanning devices and a thermal receipt printer. When the gate reader 130 uses the bar code and scanning devices to scan boarding information, it forwards the data to the workstation 120. The workstation 120 evaluates the data. The gate reader's receipt printer is activated by the workstation 120. This gives airlines the ability to produce a receipt with flight and seating formation as the passenger boards. This replaces the previous procedure, which required a separate boarding card distribution step, which is completed by the gate agent prior to actual boarding.

The GIDS 125 is a passenger information display that presents responses to frequently asked questions and general flight information for passengers in a manner which frees gate agents from this duty and allows them to focus on other responsibilities. The GIDS 125 displays dynamic and real-time air travel information on a series of screens shown on a computer monitor. The air travel information can comprise general air travel information, passenger information, flight information, and advertising information.

Passenger information comprises certain seat status information, including upgrade, standby, and boarding clearance information. For normal and upgrade standby passenger information displays, the GIDS 125 shows the number of seats available and passengers standing by for those seats. For boarding clearing displays, the GIDS 125 shows passengers who have received seat assignments and are eligible to board.

Flight information comprises flight events, such as delays, cancellations and gate changes. Flight information is sent directly to the screens through a sophisticated data delivery system that connects them to the reservation system 105. Agents may choose to display situational information by selecting from a list of pre-programmed messages or other display features, including: advisories that no seat changes or upgrades are available, seat charts, passenger boarding sequences, meal service information, and flight duration information. The GIDS 125 subscribes to event information from the reservation system 105.

The GIDS 125 allows the gate agent to see what is currently being displayed on the GIDS 125, to remove information from public display, and to manage the presentation of boarding information to the passenger via the agent's workstation 120. The GIDS 125 supports multiple languages and provides configurable displays that can readily adapt to airport and facility restrictions and preferences.

The computer network 121 is a widely used local area network communications system. The computer network 121 allows the reservation system 105, the PIDS 110, the FPES 115, the workstation 120, and the GIDS 125 to communicate with each other.

All changes to flight or passenger information are stored in the reservation system 105. The reservation system 105 forwards passenger information to the PIDS 110 and flight information to the FPES 115 through the computer network 121. The PIDS 110 and the FPES 115 forward this passenger information and flight information to the workstation 120 through the computer network 121. The Internet can obtain general air travel information from the world wide web and pass it to the workstation 120. The workstation 120 forwards the general air travel information, the passenger information, the flight information, and the advertising information to the GIDS 125 through the computer network 121. The workstation 120 and the GIDS 125 display the general air travel information, the passenger information, the flight information, and the advertising information. The workstation 120 displays this information to the agents, and the GIDS 125 displays this information to the passengers.

FIG. 2 is a block diagram illustrating an exemplary embodiment of the GIDS 125 internal components. The GIDS 125 comprises a GIDS master database 205, a GIDS manager 210 and a GIDS display 215. The GIDS master database 205 comprises an active loop database 225. Both the GIDS master database 205 and the active loop database 225 contain screen files 230. The screen files 230 hold information on what will be shown on a particular screen, when the screen will be shown, and how long to show the screen. The GIDS master database 205 holds the screen files 230 for all possible screens. The active loop database 225 holds the activated screen files 230. The GIDS manager 210 maintains a list of activated screens files and the content of those screens files. The GIDS manager 210 moves the activated screen files 230 to the GIDS display. The GIDS manager 210 contains an internal clock 230 that determines when and for how long screens are shown. The GIDS display 215 shows the screens on the computer monitor for the screen files 230 that the GIDS manager 210 sends the GIDS display.

The Modes and Screen Priority

There are three modes of operation: idle mode, departure mode, and boarding mode. Each mode has certain activated screens that are shown in that mode. Screens can be activated in three ways: pre-flagged as activated, flagged as activated by the agent accessing GIDS, or flagged as activated due to an event passed through the reservation system 105 or the Internet. Screens are prioritized in the idle mode, the departure mode, and the boarding mode. As screens of a higher priority become activated, the lower priority screens are dropped. However, a screen will never be dropped while the passengers are looking at it.

Idle mode screens are screens that hold general air travel information and advertising information and are shown 75 or more minutes before the flight departure. Departure mode screens are screens that hold general air travel information, flight information, and advertising information. Departure mode screens are shown less than 75 minutes before the flight departure, but before boarding mode. Boarding mode screens include screens with air travel information, passenger information, flight information, advertising information, and boarding information. Boarding mode screens are shown while a flight is boarding. Tables I, II, and III indicate the screens shown in idle mode, departure mode, and boarding mode.

Table I: Idle Mode Screens Listed According to Priority

1. Cell Phones Screen. This displays the airline policy regarding cell phones.
   Boarding Sequence Screen. This describes standard boarding procedures.
   Dash Ad Screen. This is an advertisement.
   Delta.com Screen. This is an advertisement.
   SkyTeam Screen. This is an advertisement.
   Arriving Flight Delayed Screen. This gives the new estimated arrival time. The agent can add the reason for delay.
   Arriving Flight Cancelled Screen. This indicates that the scheduled arriving flight has been cancelled.
   Arriving Flight Gate Change Screen. This displays the new gate assignment for arriving flight.
   Departing Flight Delayed Screen. This gives the new estimated departure time. The agent can add the reason for delay.
   Departing Flight Cancelled Screen. This indicates that the scheduled departing flight has been cancelled.
   Departing Flight Gate Change Screen. This displays new gate assignments for departing flight.

2. Next Arrival at This Gate Screen. This screen gives the flight number, city, and estimated arrival time of the next arrival.
3. Next Departure from This Gate Screen. This screen gives the flight number, city, and estimated departure time for the next departure.
4. Estimated Check-In Time Screen. This screen displays the time that agents will be checking in passengers for the next flight.
5. Do You Have a Boarding Card Screen. This screen displays an illustration of a boarding card to reassure passenger that they are ready for boarding.
6. Restroom Information Screen. This screen gives directions from the gate to the nearest restrooms.
7. Carry-On Baggage Guidelines Screen. This screen displays the carry-on baggage policy.
8. Crown Room Club Screen. This screen give the hours and directions to the Crown Room Club.
9. Reservations and Seat Assignment Screen. This screen describes policies regarding the release of seats and reservations.
10. Introductory Screen. Each origin city has its own unique introductory screen.

Table II: Departure Mode Screens Listed According to Priority

1. Standby List Screen. This lists the names of the passengers, in prioritized order, that are on the standby list. Privacy is maintained as only the first three letters of the passenger's last name, and the first letter of the passenger's first name, are shown on the screen.
   Standby Upgrade List Screen. This screen lists the name of the passengers, in prioritized order, that are on the standby upgrade list. Privacy is maintained as only the first three letters of the passenger's last name, and the first letter of the passenger's first name, are shown on the screen.
   Standby Cleared List Screen. This screen lists the name of the passengers, in prioritized order, that have cleared the standby list and have a seat available on the flight. Privacy is maintained as only the first three letters of the passenger's last name, and the first letter of the passenger's first name, are shown on the screen.
   Cell Phones Screen. This displays the airline policy regarding cell phones.
   Destination Weather Screen. This screen displays the current conditions and four day forecast followed by a weather screen.
   Regional Weather Screen. This screen displays the regional weather.
   Arriving Flight Delayed Screen. This gives the new estimated arrival time. The agent can add the reason for delay.
   Arriving Flight Cancelled Screen. This indicates that the scheduled arriving flight has been cancelled.
   Arriving Flight Gate Change Screen. This displays the new gate assignments for arriving flights.
   Departing Flight Delayed Screen. This gives the new estimated departure time. The agent can add the reason for delay.
   Departing Flight Cancelled Screen. This indicates that the scheduled departing flight has been cancelled.
   Departing Flight Gate Change Screen. This displays new gate assignments for departing flights.
   Equipment Change Screen. This indicates that the original aircraft has been substituted by another.
   Standby List Closed Screen. This indicates that agents are unable to add any more names to the standby list.
   Flight Full Screen. This indicates that the airline is unable to accommodate standby passengers due to a full flight.
   Free-Form Messages Screen. This screen allows the agent to input any message.
   No Seat Changes Screen. This indicates that passengers are not allowed to change their seats.
   Upgrade List Closed Screen. This indicates that agents are unable to add any more names to the upgrade standby list.
   Requesting Volunteers Screen. This asks for volunteers in the gate area in overbooked flight situations.
   Confirmed Customers Please Wait Until Called Screen. This asks confirmed customers to wait until their name is called.
   Standby Customers Wait Until Called Screen. This asks standby customers to wait until their name is called.
2. Estimated Boarding Times Screen. This displays the approximate time each section will board.
3. Flight Time Screen. This gives the estimated flight duration and time of arrival into the destination city.
4. Airline Partners Screen. This welcomes codeshare passengers.
5. Meals Screen. This screen provides information on the beverage service or type of meal served on the flight.
   Remember your SkyDeli Screen. This reminds passengers to pick up a snack when boarding.
6. Seating and Statistics Screen. This screen displays the seat map for the aircraft type, with statistics such as cruising speed, etc.
7. Estimated Check-In Time Screen. This screen displays the time that agents will be checking in passengers for the next flight.
8. Do You Have a Boarding Card Screen. This screen displays an illustration of a boarding card to reassure passenger that they are ready for boarding.
9. Crown Room Club Screen. This screen give the hours and directions to the Crown Room Club.
10. Restroom Information Screen. This screen gives directions from the gate to the nearest restrooms.
11. Unticketed Infants Screen. This reminds passengers that unticketed infants must be accounted for on their boarding card.
12. Carry-On Baggage Guidelines Screen. This screen displays information on the carry-on baggage policy.
13. Reservations and Seat Assignments Screen. This screen displays updated seat information to passengers.

Table III: Boarding Mode Screens Listed in Priority

1. Standby List Screen. This lists the names of the passengers, in prioritized order, that are on the standby list. Privacy is maintained as only the first three letters of the passenger's last name, and the first letter of the passenger's first name, are shown on the screen.
   Standby Upgrade List Screen. This screen lists the name of the passengers, in prioritized order, that are on the standby upgrade list. Privacy is maintained as only the first three letters of the passenger's last name, and the first letter of the passenger's first name, are shown on the screen.
   Standby Cleared List Screen. This screen lists the name of the passengers, in prioritized order, that have cleared the standby list and have a seat available on the flight. Privacy is maintained as only the first three letters of the passenger's last name, and the first letter of the passenger's first name, are shown on the screen.

Arriving Flight Delayed Screen. This gives the new estimated arrival time. The agent can add the reason for delay.

Arriving Flight Cancelled Screen. This indicates that the scheduled arriving flight has been cancelled.

Arriving Flight Gate Change Screen. This displays the new gate assignment for arriving flights.

Departing Flight Delayed Screen. This gives the new estimated departure time. The agent can add the reason for delay.

Departing Flight Cancelled Screen. This indicates that the scheduled departing flight has been cancelled.

Departing Flight Gate Change Screen. This displays new gate assignments for departing flights.

Equipment Change Screen. This indicates that the original aircraft has been substituted by another.

Standby List Closed Screen. This indicates that agents are unable to add any more names to the standby list.

Flight Full Screen. This indicates that the airline is unable to accommodate standby passengers due to a full flight.

Free-Form Messages Screen. This screen allows the agent to input any message.

No Seat Changes Screen. This indicates that passengers are not allowed to change their seats.

Upgrade List Closed Screen. This indicates that agents are unable to add any more names to the upgrade standby list.

Requesting Volunteers Screen. This asks for volunteers in the gate area in overbooked flight situations.

Confirmed Customers Please Wait Until Called Screen. This asks confirmed customers to wait until their name is called.

Standby Customers Wait Until Called Screen. This asks standby customers to wait until their name is called.

2. Boarding Sequence Screen. This describes standard boarding procedures.

3. Destination Weather Screen. This screen displays the current conditions and four day forecast followed by a weather screen.

4. Regional Weather Screen. This displays the regional weather.

5. Flight Time Screen. This gives the estimated flight duration and time of arrival into the destination city.

6. Airline Partners Screen. This welcomes codeshare passengers.

7. Meals Screen. This screen provides information on the beverage service or type of meal served on the flight. Remember your SkyDeli Screen. This reminds passengers to pick up a snack when boarding.

8. Seating and Statistics Screen. This screen displays the seat map for the aircraft type, with statistics such as cruising speed, etc.

9. Estimated Check-In Time Screen. This screen displays the time that agents will be checking in passengers for the next flight.

10. Do You Have a Boarding Card Screen. This screen displays an illustration of a boarding card to reassure passengers that they are ready for boarding.

11. Carry-On Baggage Guidelines Screen. This screen displays information on the carry-on baggage policy.

12. Unticketed Infants Screen. This reminds passengers that unticketed infants must be accounted for on their boarding card.

The Flow Diagrams

Figure 3:
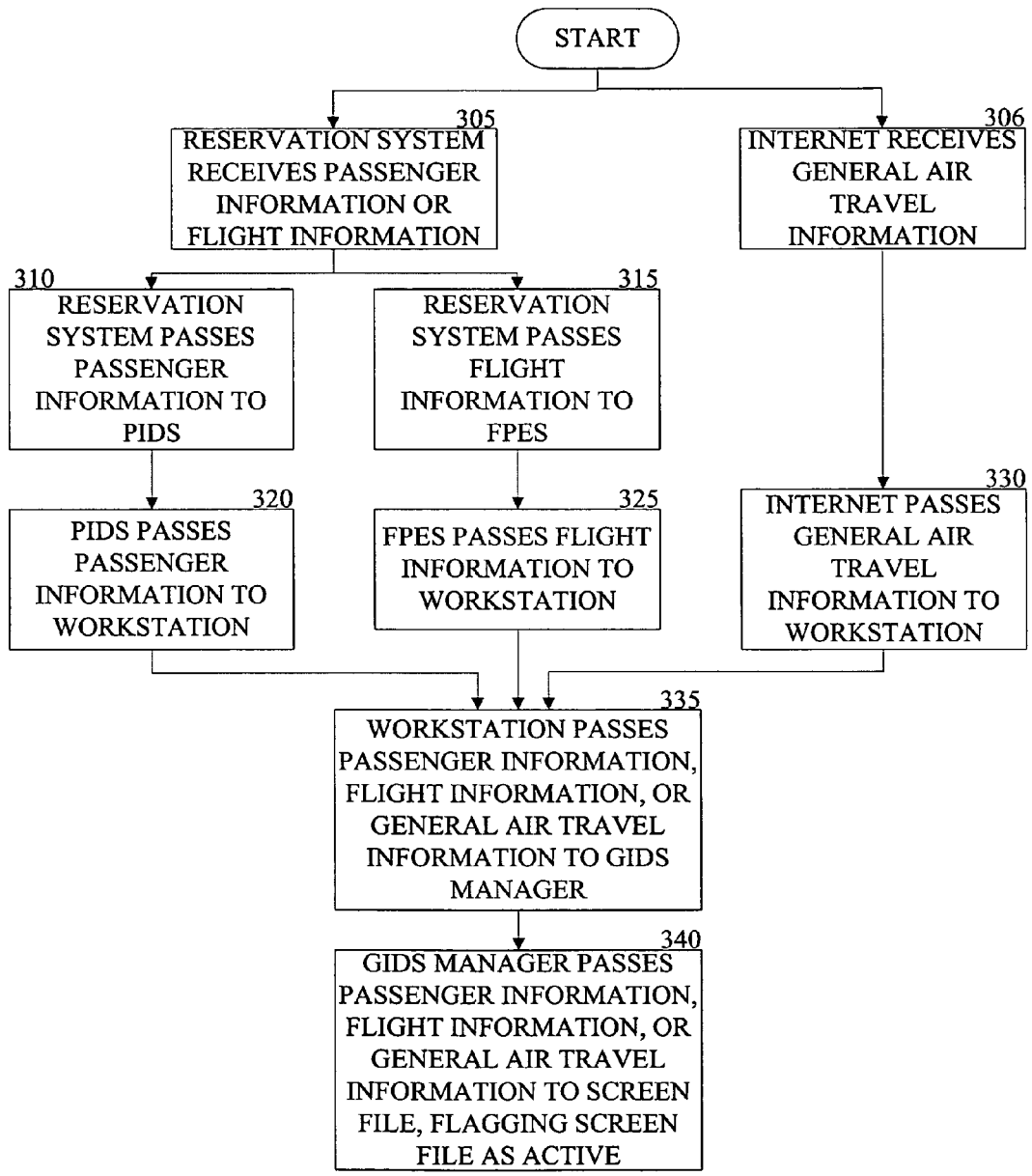
FIG. 3 is a flow diagram illustrating a process of activating a screen file for GIDS in an exemplary embodiment of the present invention.

FIG. 3 is a flow diagram illustrating the process of activating a screen file 230. As indicated above, screens can be activated in three ways: pre-flagged as activated, flagged as activated by the agent using the GIDS, or flagged as activated by an event passed through the reservation system 105 or the Internet. FIG. 3 illustrates the process of activating a screen file 230 by automatically flagging a screen file 230 as activated through the reservation system 105 or the Internet. In step 305, the reservation system 105 receives passenger information or flight information. In step 306, the Internet receives general air travel information. In step 310, the reservation system 105 passes passenger information to the PIDS 110. In step 315, the reservation system 105 passes the flight information to the FPES 115. In step 320, the PIDS 110 passes the passenger information to the workstation 120. In step 325, the FPES 110 passes the flight information to the workstation 120. In step 330, the Internet passes the general air travel information to the workstation 120. In step 335, the workstation 120 passes the passenger information, the flight information, or the general air travel information to the GIDS manager 210. In step 340, the GIDS manager 210 passes the passenger information, the flight information, or the general air travel information to the screen file 230. When the screen file 230 receives this information, the screen file 230 is flagged as active.

Figure 4:
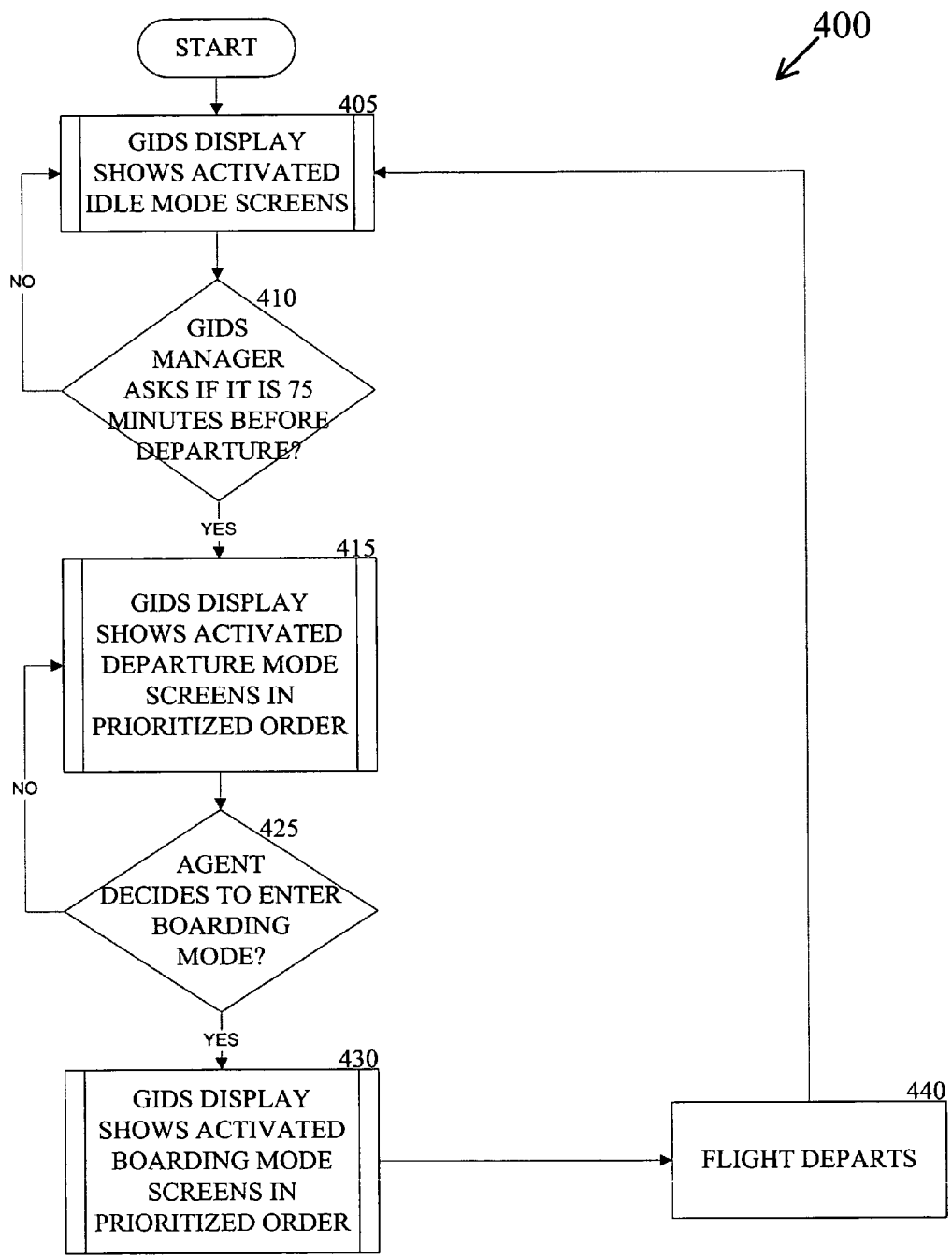
FIG. 4 is a flow diagram illustrating an overview of an exemplary method for providing updated air travel information.

FIG. 4 is a flow diagram illustrating an overview of an exemplary method for providing dynamic and real-time air travel information. In step 405, the GIDS display 215 shows the activated idle mode screens. In step 410, the GIDS manager 210 asks if it is 75 minutes before a departure. To do this the GIDS manager 210 looks at a list of departing flights published on the computer network 121. The GIDS manager 210 knows it is monitoring a flight at a specific gate (for example, gate 6), and asks if there are any flights departing from that gate. If the answer is "yes" and there is a flight departing from that gate, the GIDS manager 210 asks if that flight is departing within 75 minutes. The GIDS manager 210 is continually monitoring the computer system 121 for flight information and comparing it to the GIDS manager's internal clock 230 to see if it is 75 minutes before the flight.

If the answer to step 410 is "no" and it is not 75 minutes before the departure, the process goes back to step 405 and the GIDS display 215 shows the activated idle mode screen. If the answer to step 410 is "yes" and it is 75 minutes before a departure, the process moves to step 415, and the GIDS display 215 shows the activated departure mode screens in a prioritized order.

In step 425, the agent using the workstation 120 decides whether or not to enter boarding mode. If the answer to step 425 is "no", and the agent does not want to enter boarding mode, the process skips back to step 415, and the GIDS display 215 shows the activated departure mode screens in prioritized order. If the answer to step 425 is "yes", and the agent does want to enter boarding mode, the process moves to step 430, and the GIDS display 215 shows the activated boarding mode screens in a prioritized order. When the flight departs in step 440, the GIDS 125 exits from supporting that flight. The process returns to step 405 and is repeated.

As the process illustrated in FIG. 4 is run, the agent can, at any time, activate or inactivate certain screens. The agent does this by accessing the relevant screen file 230 through the GIDS, and turning on or off the activated flag.

Figure 5:
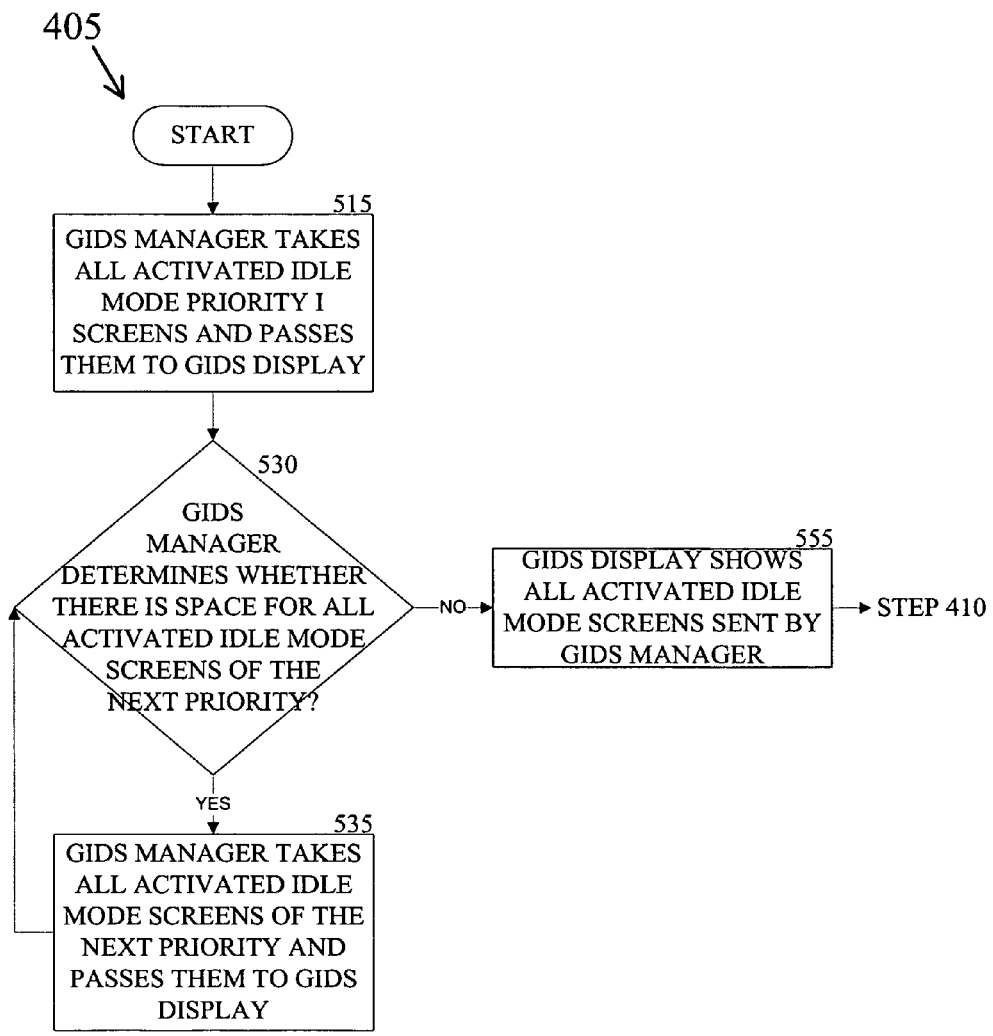
FIG. 5 is a flow diagram illustrating a process for showing activated idle mode screens in a prioritized order.

FIG. 5 is a flow diagram illustrating the process of the GIDS display 215 showing the activated idle mode screens in a prioritized order, as set forth in step 405 of FIG. 4. In step 515, the GIDS manager 210 takes all activated idle mode priority 1 screens and passes them to the GIDS display 215. In step 530, the GIDS manager 210 asks if there is space for all activated idle mode screens of the next priority. If the answer to step 530 is "yes" and there is space for all idle mode screens of the next priority, the process moves to step 535, and the GIDS manager 210 takes all activated idle mode screens of the next priority and passes them to the GIDS display 215. The process then moves back to step 530. If the answer to step 530 is "no" and there is not space for all activated idle mode screens of the next priority, the process skips to step 555, and the GIDS display 215 shows all activated idle mode screens sent by the GIDS manager 210. The process then moves to step 410 of FIG. 4.

Figure 6:
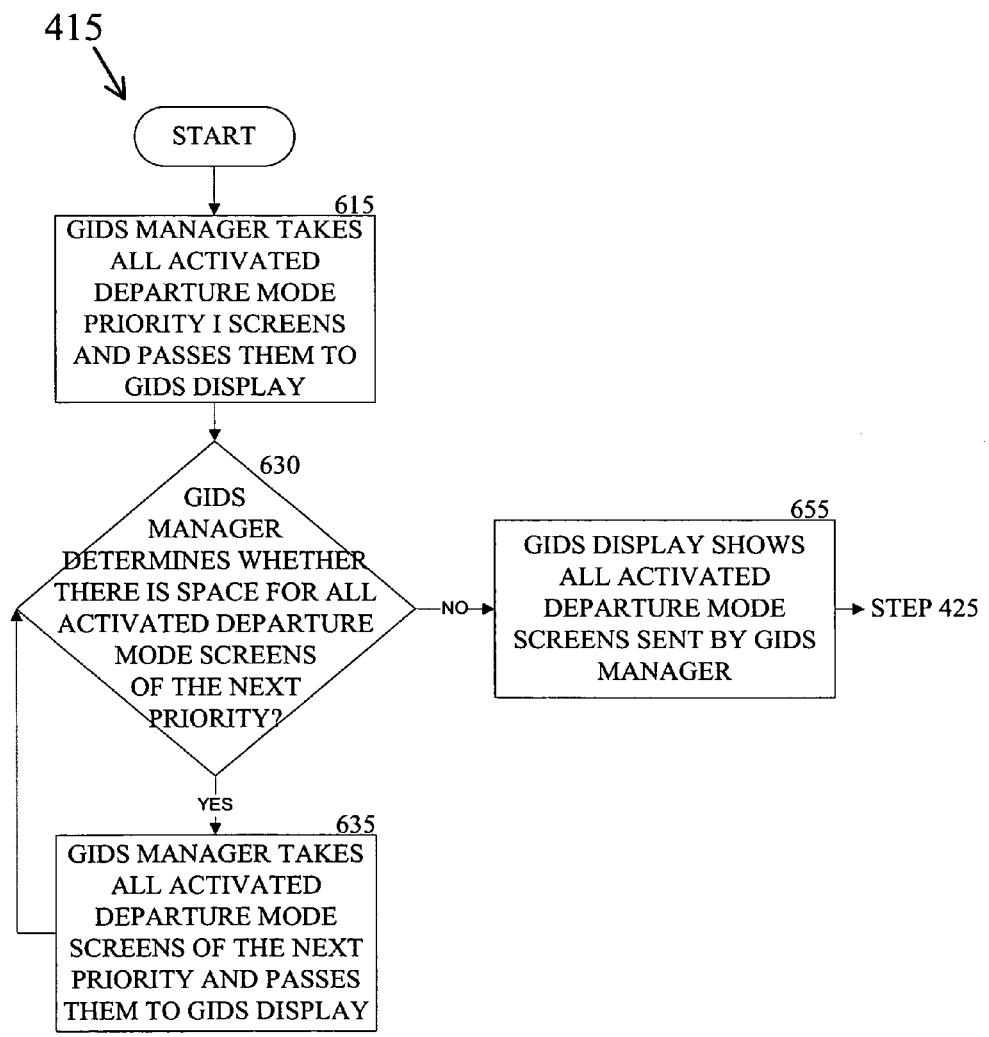
FIG. 6 is a flow diagram illustrating a process for showing activated departure mode screens in a prioritized order.

FIG. 6 is a flow diagram illustrating the process of the GIDS display 215 showing the activated departure mode screens in a prioritized order, as set forth in step 415 of FIG. 4. In step 615, the GIDS manager 210 takes all activated departure mode priority 1 screens and passes them to the GIDS display 215. In step 630, the GIDS manager 210 asks if there is space for all activated departure mode screens of the next priority. If the answer to step 630 is "yes" and there is space for all departure mode screens of the next priority, the process moves to step 635, and the GIDS manager 210 takes all activated departure mode screens of the next priority and passes them to the GIDS display 215. The process then moves back to step 630 and is repeated. If the answer to step 630 is "no" and there is not space for all activated departure mode screens of the next priority, the process skips to step 655, and the GIDS display 215 shows all activated departure mode screens sent by the GIDS manager 210. The process then moves to step 425 of FIG. 4.

Figure 7:
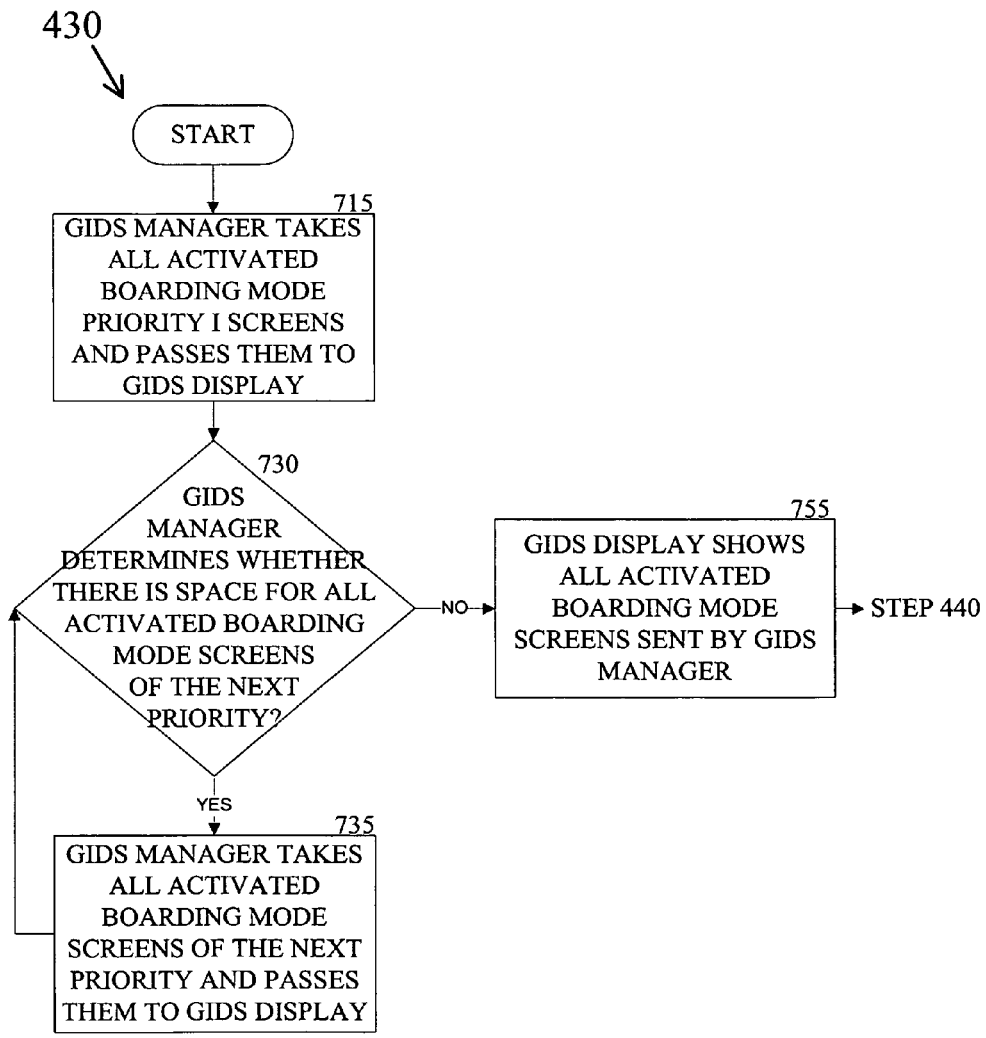
FIG. 7 is a flow diagram illustrating a process for showing activated boarding mode screens in a prioritized order.

FIG. 7 is a flow diagram illustrating the process of the GIDS display 215 showing the activated boarding mode screens in a prioritized order, as set forth in step 430 of FIG. 4. In step 715, the GIDS manager 210 takes all activated boarding mode priority 1 screens and passes them to the GIDS display 215. In step 730, the GIDS manager 210 asks if there is space for all activated boarding mode screens of the next priority. If the answer to step 730 is "yes" and there is space for all boarding mode screens of the next priority, the process moves to step 735, and the GIDS manager 210 takes all activated boarding mode screens of the next priority and passes them to the GIDS display 215. The process then moves back to step 730 and is repeated. If the answer to step 730 is "no" and there is not space for all activated boarding mode screens of the next priority, the process skips to step 755, and the GIDS display 215 shows all activated boarding mode screens sent by the GIDS manager 210. The process then moves to step 440 of FIG. 4.

The Screen Displays

FIG. 8 is a screen display illustrating the standby list screen. There are two main windows in the screen 800. The window 805 on the left shows the flight information that is shown on every screen when the mode is departure mode or boarding mode. The window 810 on the right shows the standby list window. The title of the screen "Standby List" 801 is shown. The airline logo 802 is shown. The explanatory note 815 indicates that the list is ordered by priority. There is a column 820 for the priority number of the passenger, and then there is a name column 825 that indicates the passengers name. As shown in 830, the passenger whose last name has the first three letters "CRE", and whose first name begins with an "M", is the passenger listed 2nd on the standby list. Line 835 shows the column names for seat summary, with first and coach. Line 840 shows that the seats that are checked in first class are 24, and those in coach are 131. The line 845 shows that the reserved seats in first class are 2, and those in coach are 21. The line 850 shows that the seats available in first class are 0, and the seats available in coach are 7.

FIG. 9 is a screen display illustrating the upgrade list screen. There are two main windows in the screen 900. The window 905 on the left shows the flight information that is shown on every screen when the mode is departure mode or boarding mode. The window 910 on the right shows the upgrade list window. The title of the screen "Upgrade List" 901 is shown. The airline logo 902 is shown. The time 903 is also indicated. The explanatory note 915 indicates that the list is ordered by priority. There is a column 920 for the priority number of the passenger, and then there is a name column 925 that indicates the passengers name. As shown in 930, the passenger whose last name has the first three letters "COL", and whose first name begins with an "S", is the passenger listed 3rd on the standby list. Line 935 shows the column names for seat summary, with first and coach. Line 940 shows that the seats that are checked in first class are 24, and those in coach are 131. The line 945 shows that the reserved seats in first class are 2, and those in coach are 21. The line 950 shows that the seats available in first class are 0, and the seats available in coach are 7.

FIG. 10 is a screen display for the cleared standby list. The title of the screen "Cleared Standbys" 1005 is provided. The explanation 1011 is also shown. The airline logo 1006 is also indicated. In addition, the time 1010 is also indicated. There is a name column 1015, and the first name 1020 indicates that the person whose last name starts with "Tro" and whose first name starts with "B" has a seat available, and can go ahead and board with the original boarding pass.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for displaying passenger-specific boarding information to passengers waiting to board for a departure comprising the steps of:
    continuously transmitting and updating the passenger-specific boarding information from a carrier system to a processing system, wherein the passenger-specific boarding information comprises passenger standby data;
    displaying the passenger-specific boarding information on a gate information display system coupled to the processing system, and proximate to the departure gate;
    clearing one of the passengers assigned a standby status to board; and
    prompting the cleared passenger to board by displaying a prompt on the gate information display system scanning device coupled.

2. The computer-implemented method of claim 1, further comprising the step of displaying an idle mode screen, comprising general flight information, on the gate information display system display prior to transmission of the passenger-specific information.

3. A computer-readable medium having a computer-executable instructions for performing the steps recited in claim 1.

4. A computer implemented method for displaying passenger-specific upgrade information to passengers waiting to board for a departure comprising the steps of:
   continuously receiving and updating the passenger-specific upgrade information from a carrier data system at a processing system;
   displaying, without the passenger-specific upgrade information on a gate information display system coupled to the processing system, and proximate to the departure gate;
   approving an upgrade of one of the passengers; and
   prompting the upgrade passenger to board by displaying the upgrade approval on the gate information display system.

5. The computer-implemented method of claim 4, further comprising the step of confirming the upgrade passenger's identity upon attempting board by scanning a unique identifier for the passenger with a scanning device coupled to the processing system.

6. A computer-readable medium having computer-executable instructions for performing the steps recited in claim 4.

7. A computer-implemented method for displaying passenger-specific seating information to passengers waiting to board for departure comprising the steps of:
   continuously receiving and updating the passenger-specific seating information for one of the passengers from a carrier data system at a computing system;
   in response to a signal indicating a designated time prior to departure from the terminal, displaying the passenger specific seating information on a gate information display system coupled to the computing system and proximate to the departure gate, the passenger-specific seating information consisting of a readily recognizable identifier for the passenger and a corresponding seat assignment;
   clearing one of the passengers assigned a seat to board; and
   prompting the cleared passenger to board by displaying a prompt on the gate information display system.

8. The computer-implemented method of claim 7, further comprising the step of displaying passenger upgrade information on the gate information display system.

9. A computer readable medium having computer executable instruction for performing the steps recited in claim 7.

* * * * *

UNITED STATES PATENT AND TRADEMARK OFFICE
CERTIFICATE OF CORRECTION

PATENT NO. : 7,171,369 B1  
APPLICATION NO. : 09/708890  
DATED : January 30, 2007  
INVENTOR(S) : Bertram et al.

It is certified that error appears in the above-identified patent and that said Letters Patent is hereby corrected as shown below:

Claim 1, column 12, lines 61 and 62, "prompt on the gate information display system scanning device coupled." should read -- prompt on the gate information display system.--

Claim 2, column 12, line 66, "display system display prior to transmission of the" should read -- display system prior to transmission of the --

Claim 4, column 13, line 10, "displaying, without the passenger-specific upgrade information" should read -- displaying the passenger-specific upgrade information --

Signed and Sealed this

Twenty-fourth Day of April, 2007

JON W. DUDAS  
*Director of the United States Patent and Trademark Office*